(12) United States Patent
Kozischek et al.

(10) Patent No.: US 7,493,044 B2
(45) Date of Patent: Feb. 17, 2009

(54) METHODS AND APPARATUS FOR TRANSMITTING DATA

(75) Inventors: David R. Kozischek, Hickory, NC (US); Karl T. Messmer, Hickory, NC (US)

(73) Assignee: Corning Cable Systems, LLC, Hickory, NC (US)

( * ) Notice: Subject to any disclaimer, the term of this patent is extended or adjusted under 35 U.S.C. 154(b) by 433 days.

(21) Appl. No.: 11/117,240

(22) Filed: Apr. 28, 2005

(65) Prior Publication Data
US 2006/0245756 A1    Nov. 2, 2006

(51) Int. Cl.
*H04J 14/00* (2006.01)
*H04J 14/02* (2006.01)
*G02B 6/255* (2006.01)

(52) U.S. Cl. .............. 398/72; 398/67; 398/68; 398/71; 398/83; 385/95; 385/96

(58) Field of Classification Search ........... 398/71, 398/83, 72, 66, 67, 68, 76, 79, 82; 385/15, 385/27, 31, 39, 95, 96, 97, 98, 99
See application file for complete search history.

(56) References Cited

U.S. PATENT DOCUMENTS

| | | | | |
|---|---|---|---|---|
| 4,881,789 A * | 11/1989 | Levinson | ...... | 385/48 |
| 4,961,623 A * | 10/1990 | Midkiff et al. | ...... | 385/95 |
| 5,039,194 A * | 8/1991 | Block et al. | ...... | 385/88 |
| 5,479,082 A * | 12/1995 | Calvani et al. | ...... | 398/85 |
| 5,920,412 A | 7/1999 | Chang | ...... | 359/128 |
| 6,233,074 B1 | 5/2001 | Lahat et al. | ...... | 359/118 |
| 6,334,219 B1 | 12/2001 | Hill et al. | ...... | 725/106 |
| 6,636,654 B2 | 10/2003 | McGuire, Jr. | ...... | 385/17 |
| 6,654,516 B2 | 11/2003 | So | ...... | 385/27 |
| 6,731,832 B2 | 5/2004 | Alvarez et al. | ...... | 385/16 |
| 6,754,449 B2 | 6/2004 | Chang et al. | ...... | 398/51 |
| 6,754,450 B2 | 6/2004 | Chang et al. | ...... | 398/51 |
| 6,757,495 B2 | 6/2004 | Chang et al. | ...... | 398/51 |
| 6,757,496 B2 | 6/2004 | Chang et al. | ...... | 398/51 |
| 6,757,497 B2 | 6/2004 | Chang et al. | ...... | 398/51 |
| 6,760,549 B2 | 7/2004 | Chang et al. | ...... | 398/51 |
| 6,766,114 B2 | 7/2004 | Chang et al. | ...... | 398/51 |
| 6,768,871 B2 | 7/2004 | Chang et al. | ...... | 398/51 |
| 6,798,965 B2 | 9/2004 | Zdinak et al. | ...... | 385/134 |
| 6,813,276 B2 | 11/2004 | Chang et al. | ...... | 370/432 |
| 6,819,666 B2 | 11/2004 | Chang et al. | ...... | 370/352 |
| 6,842,549 B2 | 1/2005 | So | ...... | 385/15 |
| 6,850,515 B2 | 2/2005 | Chang et al. | ...... | 370/352 |
| 6,850,707 B1 | 2/2005 | Chang et al. | ...... | 398/51 |
| 6,873,797 B2 | 3/2005 | Chang et al. | ...... | 398/51 |
| 2002/0101636 A1 * | 8/2002 | Xiao et al. | ...... | 359/127 |
| 2003/0108297 A1 * | 6/2003 | Lee | ...... | 385/47 |
| 2004/0033076 A1 * | 2/2004 | Song et al. | ...... | 398/70 |
| 2005/0031348 A1 * | 2/2005 | Choi et al. | ...... | 398/59 |
| 2006/0067702 A1 * | 3/2006 | Alicherry et al. | ...... | 398/160 |

* cited by examiner

*Primary Examiner*—M. R. Sedighian
(74) *Attorney, Agent, or Firm*—C. Keith Montgomery

(57) ABSTRACT

A method of transmitting data includes receiving a plurality of downstream wavelength streams from a first optical fiber, each wavelength stream corresponding to a separate downstream data transmission, passing all downstream streams but at least one downstream targeted-wavelength stream to a second optical fiber, and routing the downstream targeted-wavelength stream to a subscriber on a third optical fiber, wherein the first optical fiber, the second optical fiber, and the third optical fiber are connected to a single device, and wherein the third optical fiber is a drop cable.

7 Claims, 5 Drawing Sheets

METHODS AND APPARATUS FOR TRANSMITTING DATA

BACKGROUND OF THE INVENTION

1. Field of the Invention

The present invention relates generally to fiber optic networks and, more particularly, to methods and apparatus for transmitting data.

2. Description of the Related Art

At least one known method of performing a mid-span access on a optical fiber cable is to open a cable, cut at least one optical fiber at an access point and splice another optical fiber to the cut fiber. More specifically, the cable is cut at an access point creating in effect two optical fibers, a first fiber that extends from a beginning of the cable to the access point, and a second fiber extending from the access point to the end of the cable. The first fiber is spliced to a third fiber which is connected to a service user. The second fiber remains in the cable and is left as unused or dead fiber.

It would be desirable to facilitate performing a mid-span access without leaving dead fiber behind the access point.

BRIEF SUMMARY OF THE INVENTION

In one aspect, a method of transmitting data includes receiving a plurality of downstream wavelength streams from a first optical fiber, each wavelength stream corresponding to a separate downstream data transmission, passing all downstream streams but at least one downstream targeted-wavelength stream to a second optical fiber, and routing the downstream targeted-wavelength stream to a subscriber on a third optical fiber, wherein the first optical fiber, the second optical fiber, and the third optical fiber are connected to a single device, and wherein the third optical fiber is a drop cable.

Another aspect relates to a multiplier/demultiplier device including a first connection point configured to receive a plurality of downstream wavelength streams from a first optical fiber, each wavelength stream corresponding to a separate downstream data transmission, a second connection point configured to pass all streams but at least one downstream targeted-wavelength stream to a second optical fiber, and a third connection point configured to pass the downstream targeted-wavelength stream to a subscriber on a third optical fiber that is a drop cable.

In yet another aspect, a network is provided. The network includes a fiber optic communications cable carrying a plurality of downstream wavelength streams on a plurality of optical fibers, and a first multiplier/demultiplier device operationally coupled to at least a first and second optical fiber of the optical fibers, wherein the first multiplier/demultiplier device includes a first first-subscriber-connection-point configured to receive a plurality of downstream wavelength streams from the first optical fiber, each wavelength stream corresponding to a separate downstream data transmission, a second first-subscriber-connection-point configured to pass all streams but at least one downstream first-subscriber-targeted-wavelength stream to the second optical fiber, and a third first-subscriber-connection-point configured to pass the downstream first-subscriber-targeted-wavelength stream to a first subscriber on a first-subscriber third optical fiber. The network also includes a second multiplier/demultiplier device operationally coupled to at least the second optical fiber of the optical fibers, the second multiplier/demultiplier device including a first second-subscriber-connection-point configured to receive a plurality of downstream wavelength streams from the second optical fiber, each wavelength stream corresponding to a separate downstream data transmission, a second second-subscriber-connection-point configured to pass all streams but a downstream second-subscriber-targeted-wavelength stream to a downstream optical fiber, and a third second-subscriber-connection-point configured to pass the downstream second-subscriber-targeted-wavelength stream to a second subscriber on a second-subscriber third optical fiber.

DETAILED DESCRIPTION OF THE INVENTION

The present invention will now be described more fully hereinafter with reference to the accompanying drawings in which exemplary embodiments of the invention are shown. However, this invention may be embodied in many different forms and should not be construed as limited to the embodiments set forth herein. Like reference numbers refer to like elements throughout the various drawings.

Figure 1:
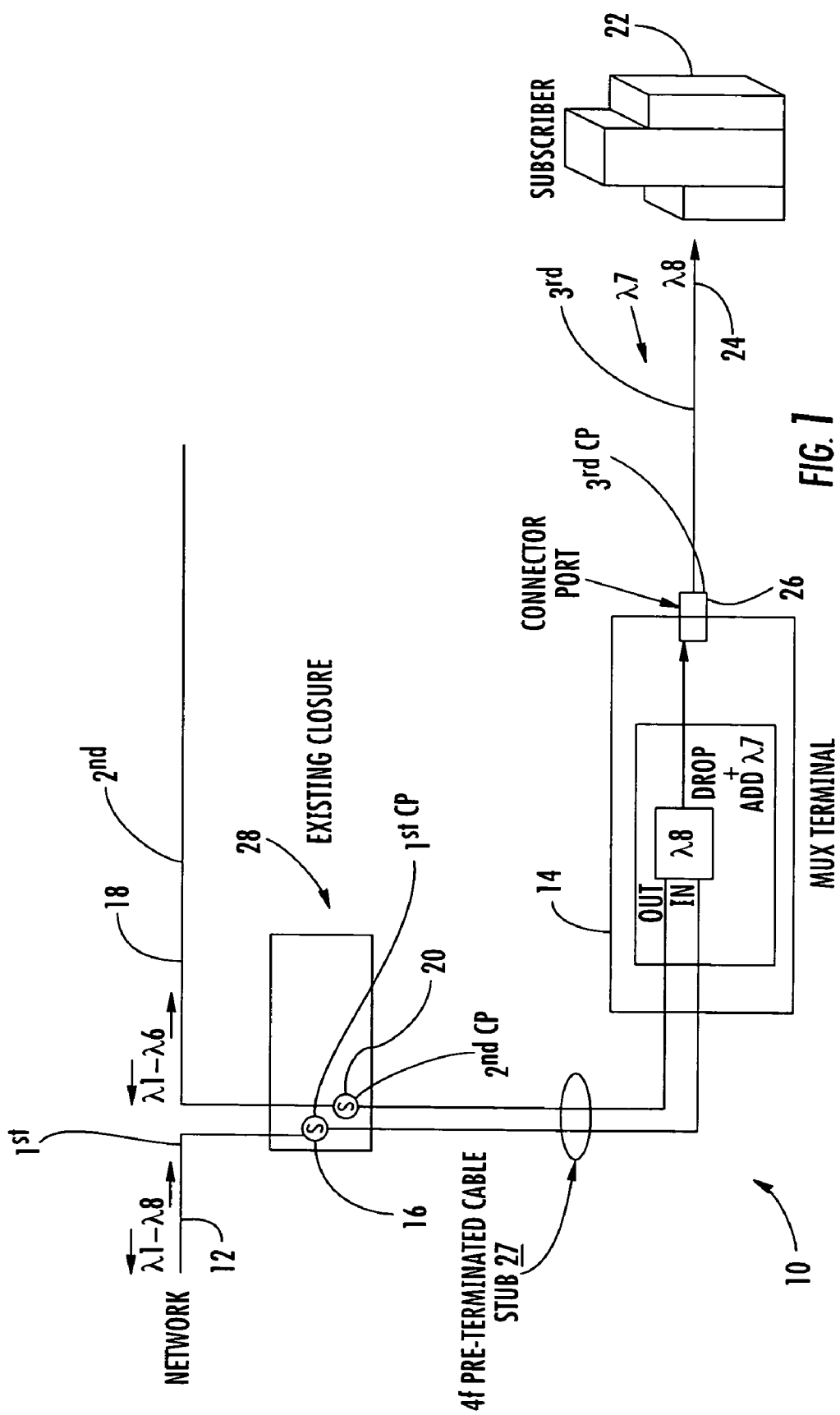
FIG. 1 is a schematic of a single fiber optic mux network architecture.

FIG. 1 is a schematic of a single fiber optic mux network architecture 10 including at least one first optical fiber 12 which carries a plurality of wavelength streams. In the illustrated example, first optical fiber 12 carries eight wavelengths $\lambda 1$-$\lambda 8$. As explained in more detail below, some wavelengths carry downstream streams while other wavelengths carry upstream streams. First optical fiber 12 is connected to a multiplier/demultiplier (mux) 14 at a first connection point 16. As used herein the term "mux" refers to a multiplier/demultiplier. In the illustrated example, first connection point 16 is a spliced connection. In other embodiments, first connection point 16 may be a connectorized connection. Mux 14 passes all downstream streams but a downstream targeted-wavelength stream ($\lambda 8$ in FIG. 1) to at least one second optical fiber 18. Second optical fiber 18 is connected to mux 14 at a second connection point 20. In the illustrated example, second connection point 20 is a spliced connection. In other embodiments, second connection point 20 may be a connectorized connection.

Mux 14 routes the downstream targeted-wavelength stream ($\lambda 8$ in FIG. 1) to a subscriber 22 on at least one third optical fiber 24. Third optical fiber 24 is connected to mux 14 at a third connection point 26. In the illustrated example, third connection point 26 is a connectorized connection. In other embodiments, third connection point 26 may be a spliced connection. Mux 14 also receives an upstream targeted-wavelength stream ($\lambda 7$ in FIG. 1) on third optical fiber 24 from subscriber 22 and routes the received upstream targeted-wavelength stream to first optical fiber 12. In an exemplary embodiment, mux 14 receives the upstream targeted-wavelength stream ($\lambda 7$ in FIG. 1) on third optical fiber 24 from subscriber 22 and receives from the second optical fiber 18 upstream wavelength streams other than the upstream targeted-wavelength stream and combines the received upstream targeted-wavelength stream ($\lambda 7$) with the received wavelength streams other than the upstream targeted-wavelength stream into a single output onto first optical fiber 12. Subscriber 22 may be a business or a residence. In an exemplary embodiment, mux 14 includes third connection point 26 as a connectorized port and a pre-terminated cable stub 27 that a craftsperson splices to fibers in an existing closure 28. Typically, third optical fiber 24 is a drop cable such as an OptiFit® Advantage Cable Assembly Drop Cable available from Corning Cable Systems of Hickory N.C. As used herein the term "drop cable" refers to the cable that connects to a Network Interface Device (NID) at the business or residence. Typically, the drop cable is between 5 meters and 2000 meters long. Any type of connector could be used for the connectorized connections, such as, for example, but not limited to, SC, LC, multifiber in UPC and APC. Existing closure 28 can also be any type of closure such as an aerial closure, a buried closure, a handhole, and a pedestal.

Figure 2:
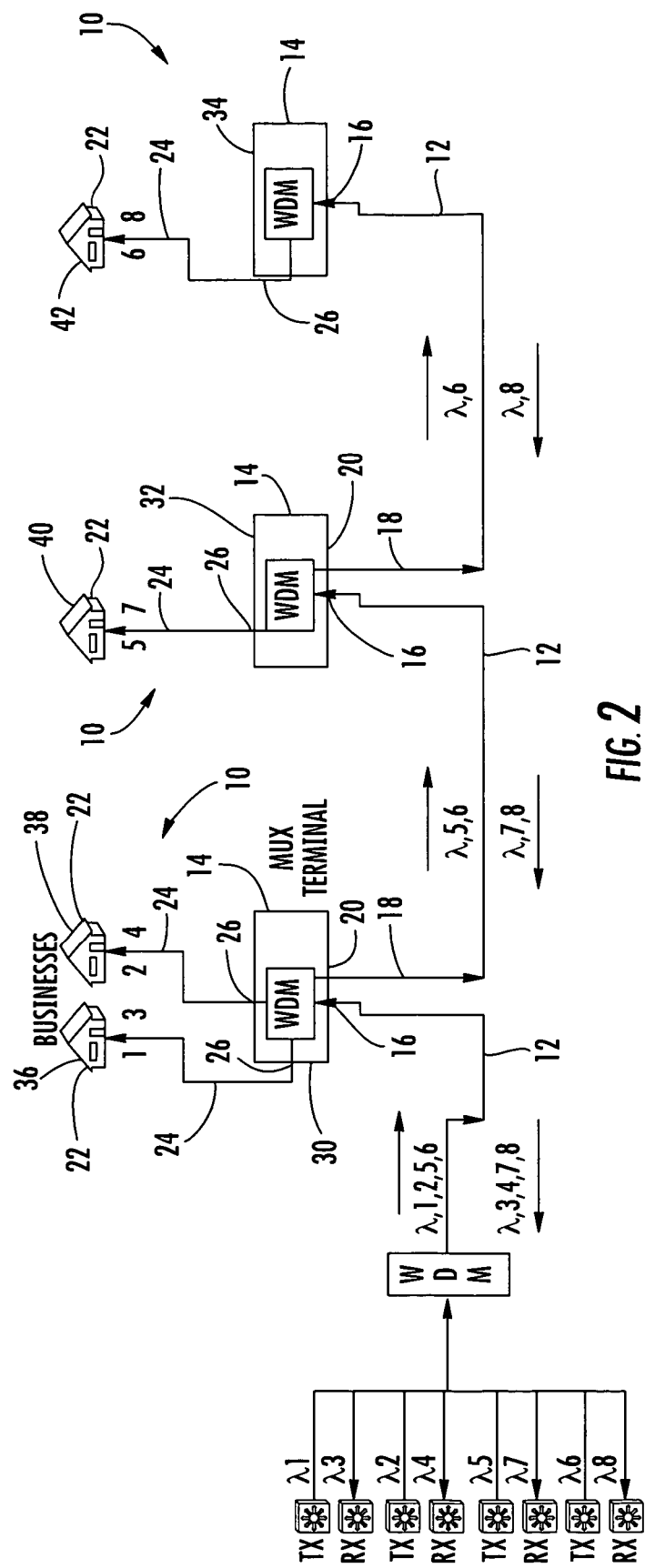
FIG. 2 illustrates a plurality of single fiber optic mux network architectures.

FIG. 2 illustrates a plurality of single fiber optic mux network architectures 10 wherein wavelengths $\lambda 1, 2, 5$, and 6 are downstream wavelengths and $\lambda 3, 4, 7$, and 8 are upstream wavelengths. Of course wavelength assignments are completely arbitrary and the figures are set forth for illustrative purposes and not for limitation reasons. Additionally, as used herein, downstream refers to data transmissions traveling to a subscriber, and upstream refers to data transmissions traveling from a subscriber. Typically, the transmissions to and from the subscriber are to a service/content provider. The service/content provider may be a single service provider such as an internet access provider or could be a multiple service operator (MSO). As illustrated in FIG. 2, a first mux 30 provides local service to two subscribers 22 and passes downstream the wavelengths that are not the downstream targeted-wavelengths ($\lambda 1$ and 2 in FIG. 2 are the downstream targeted-wavelengths and $\lambda 5$ and 6 are the other downstream wavelengths). Note that mux 30 includes two third connection points 26, one for each subscriber. It is contemplated that the benefits of the invention accrue to muxs having different numbers of third connection points 26. Also note that the second optical fiber 18 connected to first mux 30 is the first optical fiber 12 connected to a second mux 32. In other words, second optical fiber 18 of first mux 30 is an input for second mux 32. Similarly, the second optical fiber 18 connected to second mux 32 is the first optical fiber 12 to a third mux 34 which as an end mux is not connected to a second optical fiber 18. Subscribers 22 can be all businesses, all residential, and mixes thereof of both businesses and residences. As illustrated in FIG. 2, a first subscriber 36 and a second subscriber 38 are businesses and a third subscriber 40 and a fourth subscriber 42 are residences. In one embodiment, first second, and third muxs 30, 32, and 34 are identical and conform with the mux shown in FIG. 1 wherein the second connection point 20 of third mux 34 is unused. This embodiment enjoys flexibility in the field and lower inventory costs than the embodiment immediately hereinafter. However, in another embodiment, third mux 34 is different by not including second connection point 20 and is offered as an end mux. This embodiment may increase inventory requirements, but should also offer a cost savings. Additionally, third subscriber 42 can be directly connected to second mux 32 and third mux 34 is removed. In effect, second connection point 20 of second mux 32 becomes equivalent to a second third connection 26.

Figure 3:
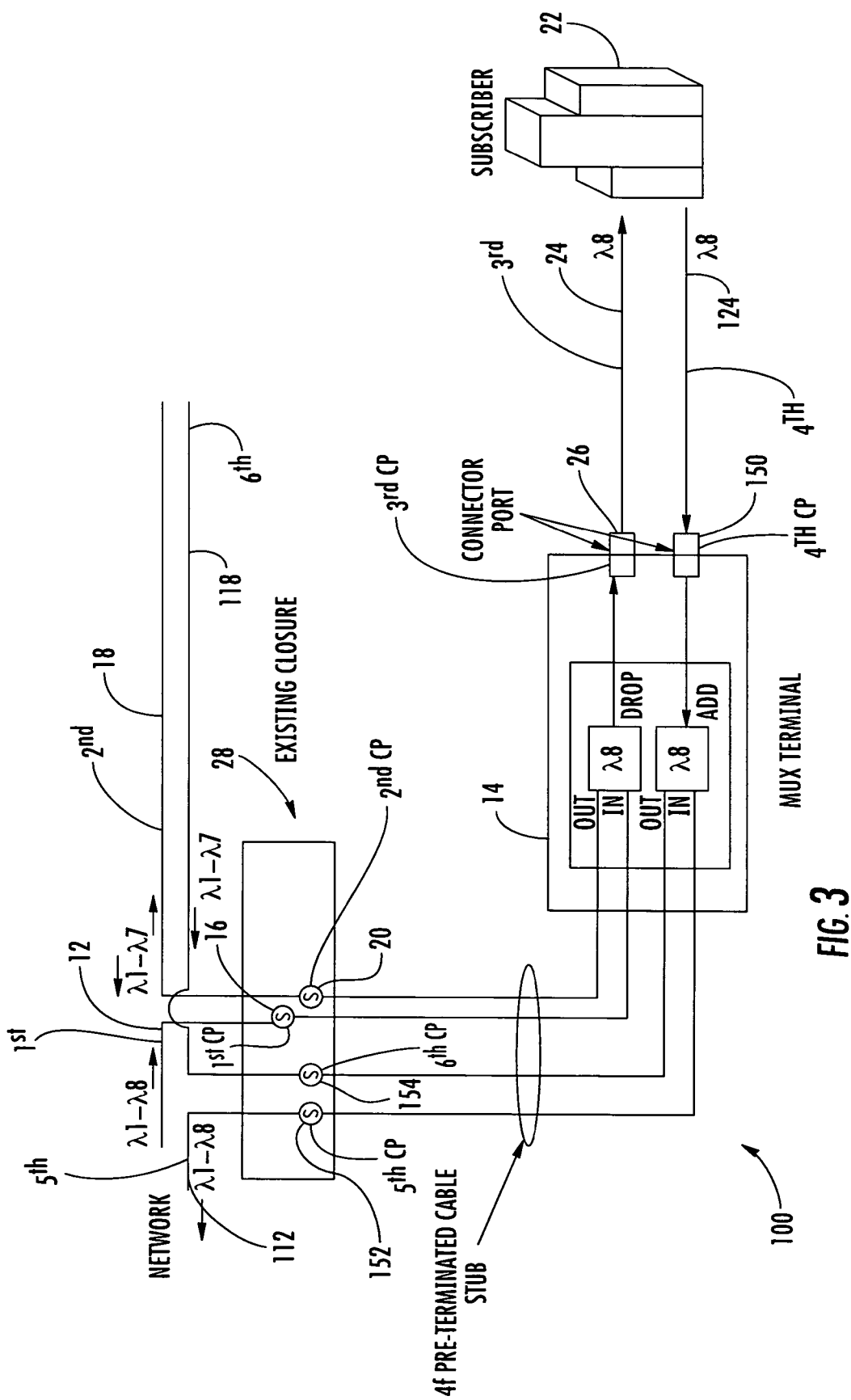
FIG. 3 is a schematic of a double fiber optic mux network architecture.

FIG. 3 is a schematic of a double fiber optic mux network architecture 100 similar to single fiber optic mux network architecture 10. Double fiber optic mux network architecture 100 including a first optical fiber 12 which carries a plurality of downstream wavelength streams. In the illustrated example, first optical fiber 12 carries eight wavelengths $\lambda 1$-$\lambda 8$. First optical fiber 12 is connected to a multiplier/demultiplier (mux) 14 at a first connection point 16. In the illustrated example, first connection point 16 is a spliced connection. In other embodiments, first connection point 16 may be a connectorized connection. Mux 14 passes all downstream streams but a downstream targeted-wavelength stream ($\lambda 8$ in FIG. 3) to a second optical fiber 18. Second optical fiber 18 is connected to mux 14 at a second connection point 20. In the illustrated example, second connection point 20 is a spliced connection. In other embodiments, second connection point 20 may be a connectorized connection. In one embodiment, FIG. 3 illustrates a CATV network.

Mux 14 routes the downstream targeted-wavelength stream ($\lambda 8$ in FIG. 3) to a subscriber 22 on a third optical fiber 24. Third optical fiber 24 is connected to mux 14 at a third connection point 26. In the illustrated example, third connection point 26 is a connectorized connection. In other embodiments, third connection point 26 may be a spliced connection. Mux 14 also receives an upstream targeted-wavelength stream (also $\lambda 8$ in FIG. 1) on a fourth optical fiber 124 from subscriber 22 and routes the received upstream targeted-wavelength stream to a fifth optical fiber 112. In an exemplary embodiment, mux 14 receives the upstream targeted-wavelength stream ($\lambda 8$ in FIG. 3) on fourth optical fiber 124 from subscriber 22 and receives from a sixth optical fiber 118 upstream wavelength streams other than the upstream targeted-wavelength stream and combines the received upstream targeted-wavelength stream ($\lambda 8$) with the received wavelength streams other than the upstream targeted-wavelength stream into a single output onto a fifth optical fiber 112. Subscriber 22 may be any facility desiring a stream, for example, a business or a residence. In an exemplary embodiment, mux 14 includes third connection point 26 as a connectorized port and a pre-terminated cable stub that a craftsperson splices to fibers in an existing closure 28. Fourth optical fiber 124 is connected to mux 14 at a fourth connection point 150. In the illustrated example, fourth connection point 150 is a connectorized connection. In other embodiments, fourth connection point 150 may be a spliced connection. Fifth optical fiber 112 is connected to mux 14 at a fifth connection point 152 and sixth optical fiber 118 is connected to mux 14 at a sixth connection point 154. In the illustrated example, fifth and sixth connection points 152 and 154 are spliced connections. In another embodiment, fifth and sixth connection points 152 and 154 are connectorized connections.

Network architecture 100 is similar to network architecture 10, but network architecture 100 allows for eight different wavelengths to be used to service eight different subscribers 22, while network architecture 10 uses eight different wavelengths to service 4 different subscribers 22. However, network architecture 10 allows for half the optical fibers used in network architecture 100. Additionally, although illustrated with eight different wavelengths, it is contemplated that the benefits of the invention accrue to architectures with N different wavelengths where N>1.

Figure 4:
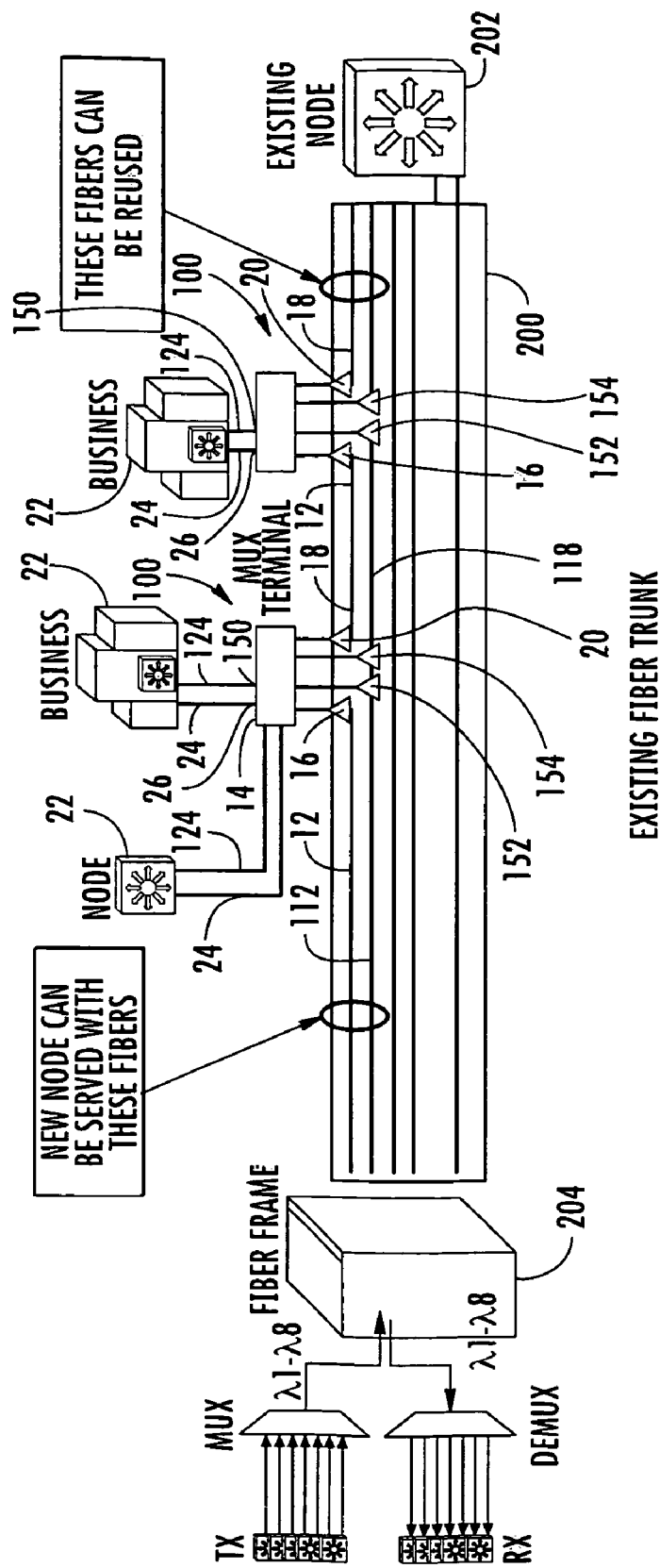
FIG. 4 illustrates how the above described architectures may be implemented with an existing fiber trunk extending to an existing node.

FIG. 4 illustrates how the above described architectures may be implemented with an existing fiber trunk 200 extending to an existing node 202. A multiplier/demultiplier (mux) 204 is used to perform Wavelength Division Multiplexing and is commonly referred to as WDM mux. More specifically, FIG. 4 illustrates two architectures 100 each having at least six connection points (16, 20, 26, 150, 152, and 154) as illustrated in FIG. 3. Typically, when fiber trunk 200 was installed it was installed with excess capacity and includes unused optical fibers (i.e., dark fibers). As described above additional WDM muxs 14 (shown also in FIGS. 1, 2, and 3), are used to parcel out different wavelengths to different subscribers 22. Note that the fibers downstream of the subscribers are not dead or dark fibers. Rather, the fibers downstream of the subscribers are usable fibers. The WDM muxs can be course (CWDM) or dense (DWDM). Typically, for a CWDM the number (N) of wavelengths added or dropped is between 1 and 10, and for a DWDM, N is between 1 and 20, both inclusive ranges. FIG. 4 illustrates a plurality of double fiber optic mux network architectures 100 and is similar to FIG. 2 except while FIG. 2 used a single fiber to each subscriber, FIG. 4 shows two fibers to each subscriber.

Figure 5:
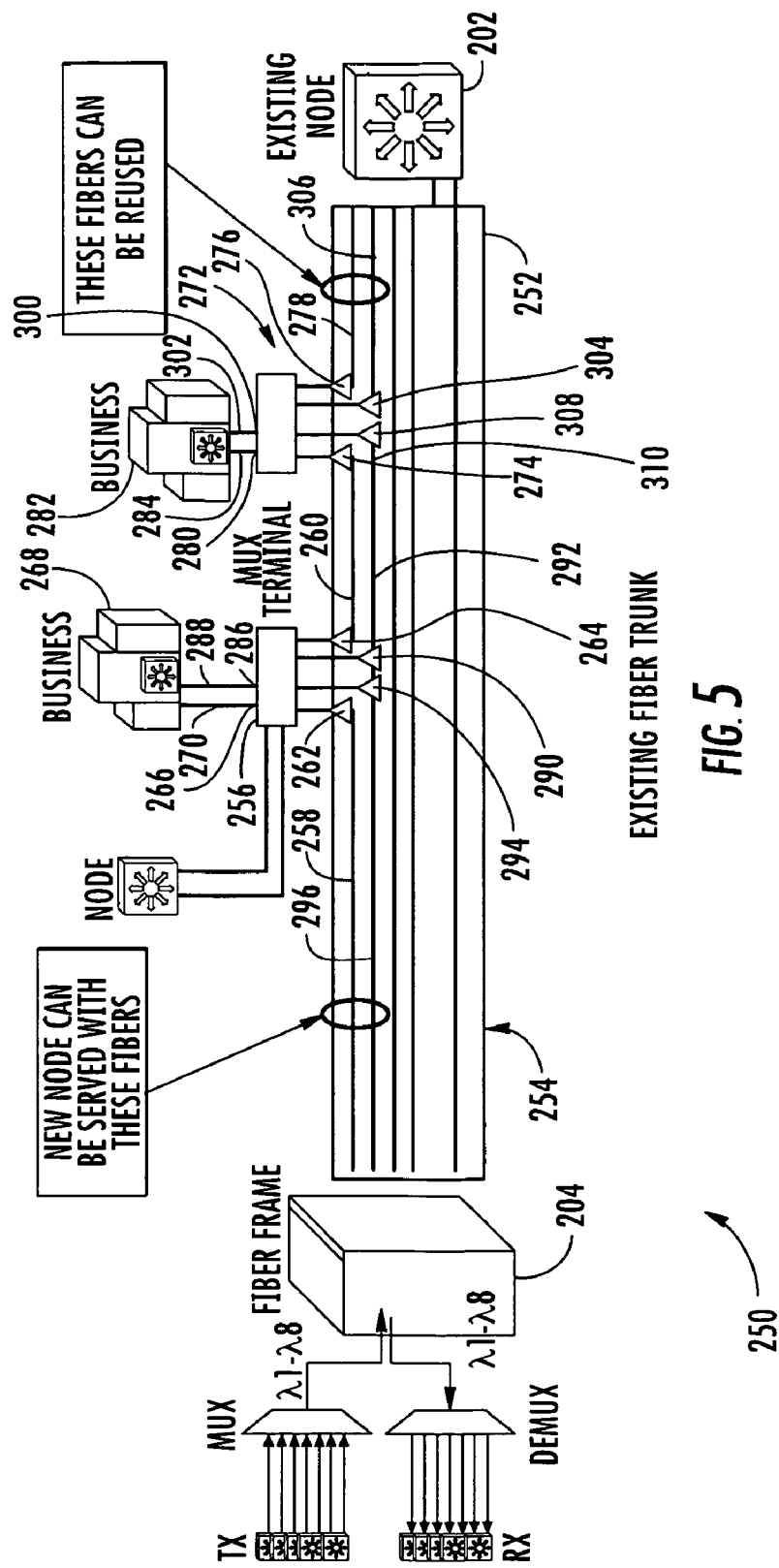
FIG. 5 is the same as FIG. 4 but with additional numbering.

FIG. 5 is the same as FIG. 4 but with additional numbering, and using slightly different terminology, FIG. 5 illustrates a network 250 including a fiber optic communications cable 252 carrying a plurality of downstream wavelength streams on a plurality of optical fibers 254, a first multiplier/demultiplier device 256 operationally coupled to at least a first optical fiber 258 and a second optical fiber 260 of the optical fibers, first multiplier/demultiplier device 256 includes a first first-subscriber-connection-point 262 configured to receive a plurality of downstream wavelength streams from the first optical fiber, wherein each wavelength stream corresponds to a separate downstream data transmission. Device 256 also includes a second first-subscriber-connection-point 264 configured to pass all streams but at least one downstream first-subscriber-targeted-wavelength stream to the second optical fiber, and a third first-subscriber-connection-point 266 configured to pass the downstream first-subscriber-targeted-wavelength stream to a first subscriber on a first-subscriber third optical fiber 270. The network also includes a second multiplier/demultiplier device 272 operationally coupled to at least the second optical fiber of the optical fibers, the second multiplier/demultiplier device including a first second-subscriber-connection-point 274 configured to receive a plurality of downstream wavelength streams from the second optical fiber, each wavelength stream corresponding to a separate downstream data transmission, a second second-subscriber-connection-point 276 configured to pass all streams but a downstream second-subscriber-targeted-wavelength stream to a downstream optical fiber 278, and a third second-subscriber-connection-point 280 configured to pass the downstream second-subscriber-targeted-wavelength stream to a second subscriber 282 on a second-subscriber third optical fiber 284.

Also, in one embodiment, first multiplier/demultiplier device 256 includes a fourth first-subscriber-connection-point 286 configured to receive from the first subscriber on a first-subscriber fourth optical fiber 288 a first-subscriber upstream targeted-wavelength stream, a sixth first-subscriber-connection-point 290 configured to receive, from a first-subscriber sixth optical fiber 292, upstream wavelength streams other than the first-subscriber upstream targeted-wavelength stream, and a fifth first-subscriber-connection-point 294 configured to output onto a first-subscriber fifth optical fiber a combination of the received first-subscriber upstream targeted-wavelength stream and the received wavelength streams other than the first-subscriber upstream targeted-wavelength stream. The second multiplier/demultiplier device includes a fourth second-subscriber-connection-point 300 configured to receive from the second subscriber on a second-subscriber fourth optical fiber 302 a second-subscriber upstream targeted-wavelength stream, a sixth second-subscriber-connection-point 304 configured to receive, from a sixth second-subscriber optical fiber 306, upstream wavelength streams other than the second-subscriber upstream targeted-wavelength stream, and a fifth second-subscriber-connection-point 308 configured to output onto a fifth second-subscriber optical fiber 310 a combination of the received second-subscriber upstream targeted-wavelength stream and the received wavelength streams other than the second-subscriber upstream targeted-wavelength stream. Additionally, in one embodiment, for both the first and second WDM muxs, the first and second connections points are spliced connections, and the third connections are connectorized connections.

The herein described methods and apparatus allow for receiving a plurality of downstream wavelength streams from a first optical fiber, each wavelength stream corresponding to a separate downstream data transmission, passing all downstream streams but at least one downstream targeted-wavelength stream to a second optical fiber, and routing the downstream targeted-wavelength stream to a subscriber on a third optical fiber, wherein the first optical fiber, the second optical fiber, and the third optical fiber are connected to a single device, and wherein the third optical fiber is a drop cable. Additionally, it is contemplated that the benefits of the invention accrue to installations with multiple fibers and therefore, as used herein the term "a" means "at least one" and these two terms are used interchangeably herein.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

That which is claimed is:

1. A method of transmitting data, said method comprising:
providing an optical fiber network and at least one splice closure for connecting a subscriber to the network;
receiving a plurality of downstream wavelength streams from at least one first optical fiber stub, each wavelength stream corresponding to a separate downstream data transmission;
passing all downstream streams but at least one downstream targeted-wavelength stream to at least one second optical fiber stub;
routing the downstream targeted-wavelength stream to the subscriber on at least one optical drop fiber, wherein the first optical fiber stub, the second optical fiber stub, and the optical drop fiber are connected to a single mux device,
wherein the mux device is located outside of the splice closure and performs said steps of passing and routing, and wherein the mux device is pre-terminated with the first optical fiber stub and the second optical fiber stub;
splicing an end of the pre-terminated first optical fiber stub to the network and locating the spliced end of the first optical fiber stub within said splice closure; and
splicing an end of the pre-terminated second optical fiber stub to the network and locating the spliced end of the second optical fiber stub within said splice closure.

2. The method in accordance with claim 1 further comprising:
receiving from the subscriber an upstream targeted-wavelength steam; and
routing the received upstream targeted-wavelength stream to a fourth optical fiber stub.

3. The method in accordance with claim 2 further comprising:
receiving, from a third optical fiber stub, upstream wavelength streams other than the upstream targeted-wavelength stream; and
combining the received upstream targeted-wavelength stream with the received wavelength streams other than the upstream targeted-wavelength stream into a single output onto the fourth optical fiber stub.

4. The method in accordance with claim 1 further comprising:

receiving from the subscriber via the optical drop fiber an upstream targeted-wavelength stream;

routing, by the mux device, the received upstream targeted-wavelength stream to a fourth optical fiber stub, wherein the mux device is pre-terminated with the fourth optical fiber stub; and splicing an end of the pre-terminated fourth optical fiber stub to the network and locating the spliced end of the fourth optical fiber stub within said splice closure.

5. The method in accordance with claim 1 further comprising:

receiving, from the subscriber, via the optical drop fiber, an upstream targeted-wavelength stream;

receiving, from a third optical fiber stub, upstream wavelength streams other than the received upstream targeted-wavelength stream;

combining, by the mux device, the received upstream targeted-wavelength stream with the received wavelength streams other than the received upstream targeted-wavelength into a single output onto a fourth optical fiber stub, wherein the mux device is pre-terminated with the third optical fiber stub and the fourth optical fiber stub;

splicing an end of the pre-terminated third optical fiber stub to the network and locating the spliced end of the third optical fiber stub within said splice closure; and splicing an end of the pre-terminated fourth optical fiber stub to the network and locating the spliced end of the fourth optical fiber stub within said splice closure.

6. The method in accordance with claim 1 wherein the mux includes a connectorized port for connecting to the optical drop fiber.

7. A device comprising:

a mux device for adding and dropping desired wavelength streams:

a first optical fiber stub that is pre-terminated to the mux device and is-configured to receive a plurality of downstream wavelength streams from an optical fiber network, each wavelength stream corresponding to a separate downstream data transmission;

a second optical fiber stub that is pre-terminated to the mux device, wherein the mux device is configured to pass all streams but at least one downstream targeted-wavelength stream through the second optical fiber stub and to the ontical fiber network;

a port for connecting to a subscriber drop fiber and passing the downstream targeted-wavelength stream to the subscriber, wherein ends of the first and second optical fiber stubs are configured to be spliced to the network and located in a splice closure along the network while the mux device is located outside of the splice closure along the network;

another port configured to receive from the subscriber via a fiber an upstream targeted-wavelength stream;

a third optical fiber stub that is pre-terminated to the mux device and is configured to receive from the network upstream wavelength streams other than the upstream targeted-wavelength stream; and a fourth optical fiber stub that is pre-terminated to the mux device, wherein the mux device is configured to output through the fourth optical fiber stub and to the network a combination of the received upstream targeted-wavelength stream and the received upstream wavelength streams other than the upstream targeted-wavelength stream, wherein respective ends of the third and fourth optical fiber stubs are spliced to the network and the spliced ends are located within in the splice closure.

* * * * *